Patented July 2, 1935

2,006,787

UNITED STATES PATENT OFFICE 2,006,787

PROCESS FOR PREPARING ACETIC ANHYDRIDE FROM ACETIC ACID

Ernst Berl, Darmstadt, Germany

No Drawing. Application March 6, 1929, Serial No. 344,927. In Germany March 6, 1928

6 Claims. (Cl. 260—123)

Various processes for preparing acetic anhydride by heating acetic acid vapors have already been proposed.

One known method, for example, consists in passing acetic acid vapors over catalysts adapted to convert acetic acid into acetone, such as oxides and carbonates of the alkali and alkaline earth metals, zinc oxide, zinc dust, cadmium, aluminum, iron or lead, care being taken to maintain the temperature so low that the formation of acetone is avoided. The maximum temperature in this case amounts to 500° C. Subsequent experiments with this process have shown that it does not yield technically useful results.

Other proposals for carrying out the process consist in excluding catalysts, such as charcoal, cerium oxide, alumina or metals and avoiding the use of temperatures, such as temperatures above 800° C., which are capable of effecting undesirable decompositions to any considerable extent. For such processes it has been proposed to employ chlorides of the alkali and alkaline earth metals, boric acid and borates, as catalysts which accelerate the anhydride formation. This method also has the disadvantage that comparatively poor yields of acetic anhydride are obtained.

Finally, it has also been proposed to carry out the process in the presence of water-fixing substances, such as bisulphates or pyrosulphates of the alkalis or alkaline earths, a proposal which has also proved to be technically unsatisfactory.

The present invention depends on the observation that on passing acetic acid vapor at temperatures of, for example, 700° C. over certain catalysts, strong reactions as regards the conversion of acetic acid are effected. These reactions, however, considerably exceed the desired degree of chain formation so that more or less large quantities of valueless by-products, such as carbon dioxide, hydrogen, ethylene and the like are obtained. Catalysts of this kind are for example so-called surface catalysts, such as asbestos, pumice, biscuit porcelain and the like, as well as substances such as colloidal silicic acid, tungstic acid etc. Silicic acid-containing substances have in general been found suitable for this purpose.

It has now been found that, when employing contact substances of this kind, the undesirable, too extensive decomposition of the acetic acid molecule can be checked by employing suitable admixtures. Admixtures of this kind are, for example, metals, such as silver, copper and the like or suitable compounds of such metals, such as carbonates, chlorides, oxides, hydroxides, phosphates, etc. Those metal compounds have been found to be particularly suitable, which, as for example chlorides, carbonates and the like, are capable of being more or less extensively converted during the process into the corresponding metals. Tungsten and certain tungsten compounds, such as tungstic oxide, have also proved to be suitable. In certain cases metals and metal compounds of different kinds may with advantage be employed.

The mixed catalysts according to this invention are preferably prepared by charging contact surfaces, such as pumice, by the usual methods with metals or metal compounds, for example by precipitating metal compounds, such as copper carbonate or silver hydroxide on the said surface contacts, or, for example, by saturating the surface contacts with suitable solutions of metal salts. The contacts charged with metal compounds may be employed as such or, if desired, be subjected to a previous treatment, by means of which the metal compounds are more or less extensively converted into the metals.

Experiments have shown that by a combination of catalysts, having in themselves too strong an action, such as asbestos, pumice and the like, with suitable metals or metal compounds such as copper, silver and their compounds, excellent yields of acetic anhydride can be obtained whilst almost entirely avoiding secondary reactions leading to acetyl-losses.

The process is confined to certain temperature ranges, which in general lie between 600° C. and 800° C. As a rule it is advisable to work within narrow temperature limits, for example between 650° C. and 750° C., with advantage at about 700° C.

The following comparative examples illustrate the technical advance which the present invention achieves.

If acetic acid vapor is passed at 700° C. through a tube charged with pumice yields of about 25% of acetic anhydride are obtained. The acetyl yield (calculated on acetic anhydride and unchanged acetic acid) amounts to about 50%—60%. The remaining acetyl groups are lost owing to decomposition with the formation of by-products.

If acetic acid vapor is passed under the same conditions at 700° C. through a tube charged with copper in solid form, yields of acetic acid amounting to about 5% are obtained.

If, on the other hand in accordance with the present invention, acetic acid vapor is passed at 700° C. through a tube, which is charged with iron-free pumice, on which copper hydroxide has been deposited, acetic acid yields of about 50%–60% and acetyl yields of about 92% are obtained.

The vapor mixture leaving the contact vessel and consisting essentially of acetic anhydride, unchanged acetic acid and a little water may be worked up in a manner known per se. According to the invention this is with advantage effected by subjecting the vapors to condensation by means of acetic acid or a previously obtained condensate. One method of procedure, for example, is to pass the vapor mixture as it leaves the contact mass through towers or the like apparatus where it is sprayed with cooled condensate or cooled strong acetic acid. The applicant has ascertained that the waste gases of the reaction still contain chains, which on coming into contact with strong cooled acetic acid are recovered as anhydride.

*Examples*

1. Asbestos carefully freed from iron is saturated with copper chloride and dried. By passing acetic acid vapors over this contact mass at temperatures of about 700° C. a yield of more than 90% of total acetyl is obtained, of which 60% and more consists of acetyl in the form of anhydride. The reaction product contains besides acetic anhydride and acetic acid also small quantities of acetone, which may be recovered according to the usual methods.

2. Copper carbonate is precipitated on pumice carriers, which have been freed from iron preferably by boiling with acids. By passing acetic acid vapors over at about 720° C. acetyl yields of more than 90% are obtained. About 50% of the acetyl employed are obtained in the form of acetic anhydride.

3. Silver hydroxide is precipitated on iron-free pumice. By passing acetic acid vapor over at 680°–690° C. yields are obtained similar to those in Example 2.

After the process has been in operation for some time the contact masses become weaker in their action. It has been found that the reactive period of the contacts may be prolonged by passing small quantities of oxygen, for example in the form of air, through the contact vessels simultaneously with the acetic acid vapors. An efficacious method of regenerating exhausted contact masses is to pass oxygen-containing gases, for example air, at elevated temperatures over the said contact masses, for example by interrupting the passage of acetic acid vapor from time to time and passing air alone through the contact vessels.

What I claim is:—

1. A process for the production of acetic anhydride by the pyrolytic decomposition of acetic acid vapors at a temperature of from 600° C. to 800° C. in the presence of a compound catalytic mixture which comprises a substance selected from the group consisting of asbestos, colloidal silicic acid, pumice, and porcelain, and at least one substance selected from the group consisting of copper, silver, and compounds thereof which decompose under the reaction conditions.

2. A process for the production of acetic anhydride by the pyrolytic decomposition of acetic acid vapors at a temperature of from 600° C. to 800° C. in the presence of a compound catalytic mixture of asbestos and copper carbonate.

3. A process for the production of acetic anhydride by the pyrolytic decomposition of acetic acid vapors at a temperature of from 600° C. to 800° C. in the presence of a compound catalytic mixture of colloidal silicic acid and at least one copper compound which under the conditions of the process is readily decomposed.

4. A process for the production of acetic anhydride by the pyrolytic decomposition of acetic acid vapors at a temperature of from 600° C. to 800° C. in the presence of a compound catalytic mixture of colloidal silicic acid and copper carbonate.

5. A process as claimed in claim 1 in which the mixture is substantially free of iron.

6. A process for the production of acetic anhydride by the pyrolytic decomposition of acetic acid vapors at a temperature of from 600° C. to 800° C. in the presence of a compound catalytic mixture of asbestos, and at least one copper compound which under the conditions of the process is readily decomposed.

ERNST BERL.